US011875361B2

(12) United States Patent
Geerdink

(10) Patent No.: US 11,875,361 B2
(45) Date of Patent: Jan. 16, 2024

(54) REAL-TIME DIGITAL DEVICE USER INTERACTION CONTROL SYSTEM

(71) Applicant: Robert Geerdink, Elanora Heights (AU)

(72) Inventor: Robert Geerdink, Elanora Heights (AU)

(*) Notice: Subject to any disclaimer, the term of this patent is extended or adjusted under 35 U.S.C. 154(b) by 392 days.

(21) Appl. No.: 17/310,014

(22) PCT Filed: Feb. 21, 2020

(86) PCT No.: PCT/AU2020/050153
§ 371 (c)(1),
(2) Date: Jul. 9, 2021

(87) PCT Pub. No.: WO2020/172701
PCT Pub. Date: Sep. 3, 2020

(65) Prior Publication Data
US 2022/0084107 A1 Mar. 17, 2022

(30) Foreign Application Priority Data
Feb. 28, 2019 (AU) .................................. 2019900636

(51) Int. Cl.
*G06Q 30/015* (2023.01)
*H04W 4/021* (2018.01)

(52) U.S. Cl.
CPC ........... *G06Q 30/015* (2023.01); *H04W 4/021* (2013.01)

(58) Field of Classification Search
CPC ................. G06Q 30/015; H04W 4/021

USPC ........................................................ 455/456.3
See application file for complete search history.

(56) References Cited

U.S. PATENT DOCUMENTS

| | | | |
|---|---|---|---|
| 2008/0004951 A1 | 1/2008 | Huang et al. |
| 2011/0178863 A1 | 7/2011 | Daigle |
| 2014/0040048 A1 | 2/2014 | Hutcherson |
| 2015/0066707 A1 | 3/2015 | Unger et al. |
| 2016/0042367 A1 | 2/2016 | Vastbinder, Jr. et al. |
| 2016/0210682 A1 | 7/2016 | Kannan et al. |
| 2016/0260155 A1 | 9/2016 | Landsman |

(Continued)

OTHER PUBLICATIONS

Australia Search Report dated Jan. 13, 2020 from Australia Application No. 2019900636.

(Continued)

*Primary Examiner* — Thomas J Lett
(74) *Attorney, Agent, or Firm* — INNOVATION CAPITAL LAW GROUP, LLP; Vic Lin

(57) ABSTRACT

A real-time digital device user interaction control system generates user interactions in substantial real-time in accordance with user-specified attribute settings. A server, in operable communication with an electronic device experience management subsystem, generates a unified visitor structured data file comprising configured privacy setting attributes and pre-pushes the unified visitor structured data to the electronic device experience management subsystem. The electronic device experience management subsystem is then able to generate digital experiences in accordance with the configured attributes in substantial real-time without adverse network latency effects by not having to query the server. The structured data file may also be pushed to sensors to control the data capture thereof.

23 Claims, 1 Drawing Sheet

(56) References Cited

U.S. PATENT DOCUMENTS

2018/0025089 A1* 1/2018 Chin .................. G06F 16/9535
  707/706
2019/0034972 A1 1/2019 Watson et al.

OTHER PUBLICATIONS

International Search Report & Written Opinion dated Jun. 2, 2020 from PCT Application No. PCT/AU2020/050153.

* cited by examiner

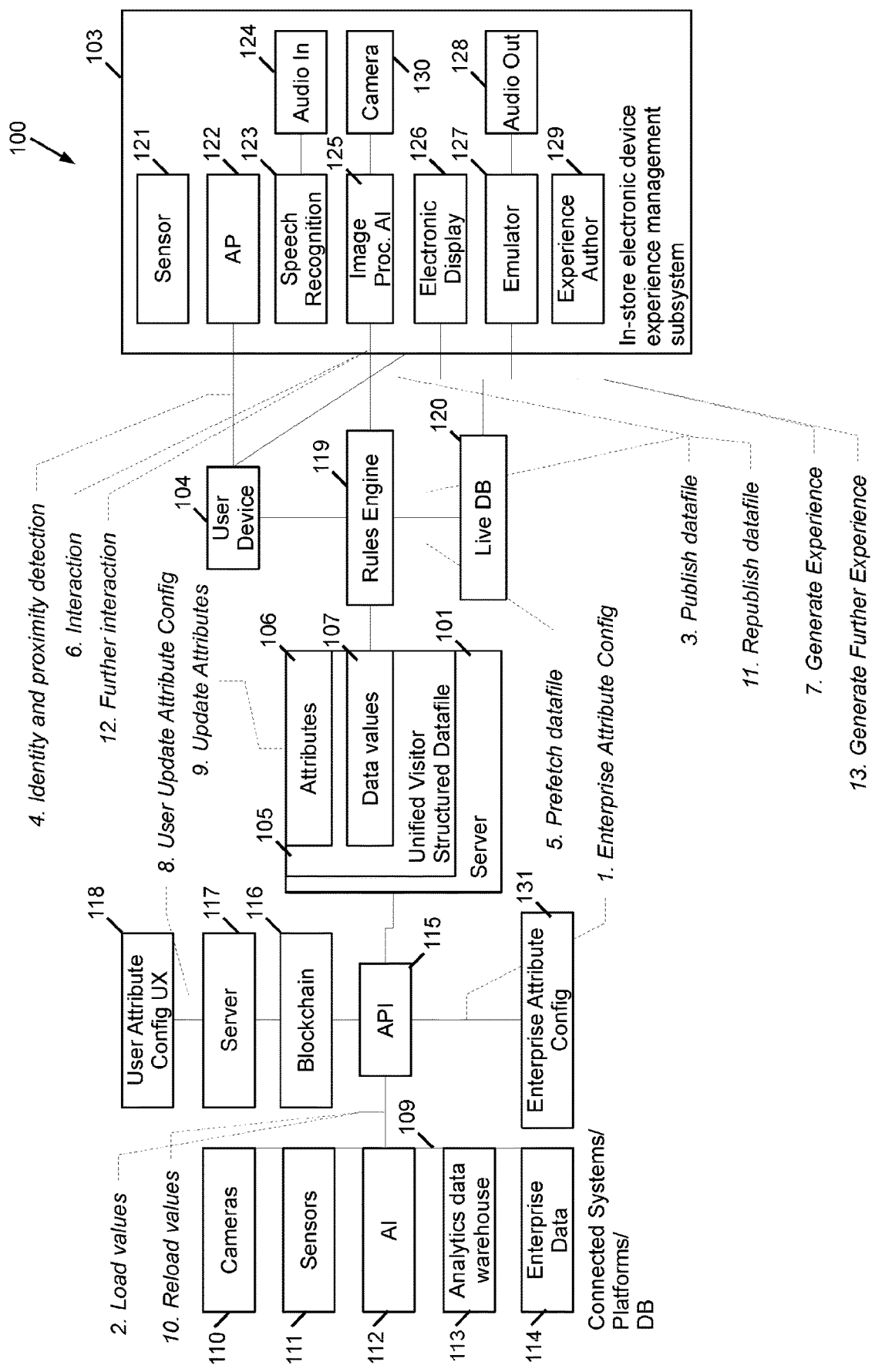

REAL-TIME DIGITAL DEVICE USER INTERACTION CONTROL SYSTEM

FIELD OF THE INVENTION

This invention relates generally to real-time digital device user interaction control system for generating user interactions in substantial real-time in accordance with user-specified settings.

BACKGROUND OF THE INVENTION

In-store electronic device experience management systems may generate customer experiences in-store including for various zones therein by sensing and/or identifying a customer and outputting customer specific experience data via electronic display devices, audio output devices and the like.

Customer specific data may for example, comprise attributes relating to customer profile, product holdings, recent interactions, unused features, purchase history, preferences, loyalty and rewards, predicted intent, interactions and purchase history.

For example, US 2019/0034972 A1 (Watson et al.) 31 Jan. 2019, discloses a system for detecting a user mobile device within proximity of the display device (such as by using wireless signals, facial recognition and the like), obtaining profile data and displaying media on the display device accordingly.

Furthermore "AI-at-the-edge" intelligent devices such as artificially intelligent capable CCTV cameras (such as the AWS™ DeepLens™) may perform image recognition to detect aspects such as a unique ID, predicted age, predicted gender and predicted intent.

However, many of these customer systems do not comply with data protection and privacy laws for individuals such as of the stringent data protection and privacy mandated by EU General Data Protection Regulation (GDPR), California Consumer Privacy Act (CCPA) and the like.

For example, a customer may not consent to the use of certain fields of their profile data (which, for example may include customer profile, product holdings, recent interactions, unused features, purchase history, preferences, loyalty and rewards, predicted intent, interactions and purchase history) used by these in-store customer experience electronic systems.

As such, a need exists for a way in which to generate these electronic experiences which are configured in accordance with user permissions.

According to Watson, once the media manager identifies user devices of users who have previously agreed to participate in sharing information with the media manager, the media manager then retrieves user profile data and display rules from a server across a network for the display of media content.

However, real-time responsiveness for in-store electronic device experience management subsystems is critical. If a system was required to identify a customer using facial recognition and then query a remote server as to whether the user has consented to their customer profile being used or to obtain display rules (so as to allow an associated electronic display to display their first name for example) as taught by Watson, the latency from these computational tasks would be unacceptable. For example, for digital experience responsiveness the customer may be required to be identified and the information displayed in milliseconds.

As such, a need therefore exists for a way in which to dynamically configure these in-store electronic experiences in accordance with user privacy settings in substantial real-time without substantially data retrieval latency affecting the responsiveness thereof.

Furthermore, it may be a requirement that an in-store sensor not record certain types of data for specific individuals in the first place.

As such, a need therefore exists for a way in which to allow in-store sensors to determine in substantial real-time whether to record data of certain user profile attributes.

Whereas the embodiments are described herein with reference to the exemplary application of in-store customer experience generation, the embodiments need not necessarily be limited to this particular application and may find application in other physical environments such as the connected home, airports aircraft in-flight passenger entertainment systems, in vehicle entertainment systems and the like, for example.

It is to be understood that, if any prior art information is referred to herein, such reference does not constitute an admission that the information forms part of the common general knowledge in the art, in Australia or any other country.

SUMMARY OF THE DISCLOSURE

There is provided herein a real-time digital device interaction control system for generating user interactions in substantial real time in accordance with user-specified settings.

The system comprises a server in operable communication with at least one in-store electronic device experience management subsystem. The subsystem may comprise at least one output electronic device, such as a digital display (digital screen, digital projector or the like), audio output device and the like. The subsystem may further comprise at least one sensor configured for identifying a customer and, in embodiments, the presence of a customer so as to, for example, be able to detect when customer is in front of a particular digital display.

The server is configured for generating a unified visitor structured data file having configured attributes. These configured attributes are configurable by the user from a set of available attributes, such as those relating to customer profile, product holdings, recent interactions, unused features, purchase history, preferences, loyalty and rewards, predicted intent, interactions and purchase history. For example, by interacting with the system, such as by way of a third-party server, the customer may specify that the customers purchase history is not to be used by the subsystem.

As such, the server is configured for updating the unified visitor structured data file in accordance with these user settings. In embodiments, the server may prepopulate data values for these configured attributes using one or more data sources.

The server is configured for pre-publishing the configured unified visitor structured data file to the electronic device experience management subsystem. In one manner, the server publishes the unified visitor structured data file to a live database of the subsystem, such as one which is operably coupled to at least one electronic device thereof via a live connection, such as via a database watcher, web sockets or the like.

As such, when identifying a customer, the configured unified visitor structured data file may be retrieved from the live database without a round-trip query to the server and associated latency. As such, the information displayed using the at least one output electronic device may be quickly and dynamically configured according to the configured attributes of the unified visitor structured data file.

As such, unlike the system taught by Watson which queries the server for profile data, the present system is able to display customer-controlled privacy compliant digital information in substantial real-time without adverse effects of network latency. Furthermore, the structured data file is able to identify which types of user profile data may be used for the display of information and which may not.

Yet further, the unified visitor structured data file may be published to memory devices of the various sensors themselves.

As such, a sensor may utilise the unified visitor structured data file to determine in substantial real-time whether to record particular types of information or not. For example, a camera control using AI image processing may determine from the configured attributes of the unified visitor structured data file not to record data relating to predicted intent.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a real-time digital device user interaction control system in accordance with an embodiment.

DESCRIPTION OF EMBODIMENTS

FIG. 1 shows a real-time digital device user interaction control system 100 in accordance with an embodiment.

The system 100 comprises a server 101 in operable communication with a plurality of in-store electronic device experience management subsystems 103.

Each in-store electronic device experience management subsystem 103 comprises at least one digital output device such as electronic displays 126 and audio output devices 128. The audio output devices 128 may be controlled by speech emulators 127.

Each in-store electronic device experience management subsystem 103 may further comprise at least one sensors for customer identification and, in embodiments, customer presence detection.

For example, the subsystem 103 may comprise a proximity sensor 121 which may detect the proximity of a customer, including within various zones of a store. These proximity sensors 121 may be physical passive infrared sensors but, in a preferred embodiment, comprises virtual proximity sensors relying on received signal strength indication (RSI), Bluetooth Low-Emission (BLE/vBLE) or Ultra Wide Band (UWB) transmissions from a customer smartphone device 104 or wearable device by an access point 122 to determine the relative position of the customer within the store.

The subsystem 103 may further comprise an audio input device 124 and speech recognition controller 123 for customer speech recognition.

The subsystem 103 may further comprise at least one camera 130. The camera 130 may be operably coupled to an image processing module 125, such as one employing AI for detecting aspects such as a visitor's proximity, facial ID, predicted age, predicted gender and predicted intent using image processing.

The subsystem 103 may comprise an experience author controller 129 configured for outputting data of various experiences via the electronic display 126 and audio output device 128.

The server 101 may be configured for generating a unified visitor structured data file 105. The data file 105 may comprise a plurality of attributes 106, such as attributes 106 relating to a customer profile (such as first name, age, gender and the like), product holdings (such as active products, subscriptions, leases and the like), recent interactions (representing previous customer interactions both physical and virtual), unused features (representing any unused self-care capability and the like), purchase history (including a customer's previous product/service purchase history), preferences (communication preferences, wish list, shopping lists and the like), loyalty and rewards (available rewards, discounts, offers and the like) and predicted intent (such as a customer's predicted purchase intent derived via AI analysis of customer specific data).

The data file 105 may further comprise a plurality of data values 107 corresponding to the attributes 106.

The data file 105 may be a structured data file, such as in JSON format.

The server 101 allows for configuration of the attributes 106 via an API 115. For example, an enterprise attribute configuration controller 131 may configure a plurality of available attributes 106, including those outlined above.

The API 115 may further allow for customer sub-selection of the available attributes 106 using a user attribute configuration user interface 118. For example, of the eight available attributes outlined above, the user may decide to disable use of predicted intent and recent interactions attributes 106.

The server 101 may further receive data from data sources 109 including connected systems, platforms and databases to populate the data values 107 of the attributes 106.

These connected systems may comprise data received via cameras 110 and sensors. The platforms may comprise AI analysis system such as the Mist' vBLE system an analytics data warehouse 113, such as Google BigQuery™ and enterprise data systems 114 such as the Cloudera™ enterprise data system.

Whereas the enterprise attribute configuration controller 131 may be enterprise specific, the user attribute configuration user interface 118 may be generically provided by a third-party server 117 which interacts with various enterprises to allow users to update their permissions centrally. These third-party servers 117 may interact directly with APIs 115 of various enterprises or alternatively indelibly store user-specified permission settings in a distributed block chain ledger 116.

Exemplary processing of the system 100 will now be provided with reference to an exemplary application wherein a telecommunication service provider operates various stores each having an associated in-store electronic device experience management subsystem 103.

Each in-store electronic device experience management subsystem 103 comprises an electronic display 126 (such as digital screen, digital projector or the like) and associated audio output device 126 which is configured to identify a customer and, when detecting the presence of the customer in front of the digital display 126, display customer specific data thereon, such as by, for example, greeting the customer by name and asking whether the customer wishes for assistance with the customers previously purchased iPhone X. The customer may interact with the display 126 using the audio input device 124, touch gestures and the like. In alternative embodiments, the customer specific data may be displayed by a digital display of the user device 104.

As such, the method comprises step one wherein the telecommunication service provider configures the various available attributes. In this example, the telecommunication service provider may configure the aforedescribed eight attributes relating to customer profile, product holdings, recent interactions, unused features, purchase history, preferences, loyalty and rewards, predicted intent, interactions and purchase history as being available.

As such, the server 101 generates the structured data file 105 with these configured attributes 106. The configured attributes 106 of the structured data file 105 are used by the electronic device experience management subsystem 103 to providing personalised digital experiences.

Step two comprises the server 101 updating the data values 107 for the attributes 106 from the various data sources 109. For example, the customer profile attributes of the structured data file 105 may be updated with the customer's name. In embodiments, the values may be loaded in order of priority from a hierarchical arrangement of data sources 109, such as data sources 109 arranged in a hierarchy from most trusted to least trusted data sources 109.

Step three may comprise pre-publishing the data file 105 to the in-store electronic device experience management subsystem 103.

Publication may comprise publishing the data file 105 to a live database 120 within the same or proximate network (to reduce or eliminate network latency effects) as the in-store electronic device experience management subsystem 103. A live connection may interface the live database 120 with the electronic devices of the subsystem 103, such as by using web sockets, database watcher or the like.

In alternative embodiments, the data file 105 may be published or stored by the user device 104 (and periodically updated when required) which, when in proximity with the in-store electronic device experience management subsystem 103, transmits the data file 105 to the in-store electronic device experience management subsystem 103. For example, the user device 105 may comprise Ultra Wide Band (UWB) technology allowing the user device 104 to detect and communicate with the in-store electronic device experience management subsystem 103 directly.

Publication may further comprise publishing the structured data file 105 to specific sensors of the subsystem 103. For example, the structured data file 105 may be published to the memory of the image processing AI controller 125.

Step four may comprise identity and/or proximity detection.

Identity detection may, for example, comprise receiving a wireless transmission via the access point 122 from a smartphone device of the customer. The smartphone device may comprise a software application comprising a user identity configuration setting which is transmitted via the access point 122 to identify the customer.

The customer may be identified in other manners, such as by way of facial recognition and the like.

In embodiments, the structured data file 105 for the identified customer may be pre-fetched at step five thereby negating the need to pre-publish all customer data files to all subsystems 103. For example, when the customer is near the store, the access point 122 may detect wireless transmissions from the smartphone device 104 of the customer within a range of 100 m. As such, the system 100 is able to prefetch the structured data file 105 for the identified customer in anticipation of the customer entering the store.

Alternatively, as alluded to above, the structured data file 105 may already have been pre-published to the subsystem 103.

Step six may comprise a user interaction and step seven comprise the generation of the user experience by the in-store electronic device experience management subsystem 103. For example, the virtual sensor 121 may detect that the user is standing in front of the electronic display 126 and therefore display an experience thereon. The experience may be controlled by an experienced author controller 129. In this regard, the system 100 may comprise a rules engine 119 comprising a rule that specifies when an identified customer is detected as being within proximity of the electronic display device 126, the experience author controller 129 must generate a welcome experience. As such, the experience author controller 129 may display the welcome experience which is configured with customer specific data retrieved from the data values 107 of the structured data file 105.

It should be noted that the experience author 129 is able to retrieve the data values locally from the live database 120, thereby negating a round-trip query to the server 101 and associated latency.

As such, for example, the electronic display 126 may display information and play out audio stating "Hello Roger, can I help you with your iPhone X?" or "Hello Roger, you seem interested in our home broadband product, can I help?" and the like. The customer may then interact using the touch overlay of the electronic display 126, audio input device 124 and the like.

However, the customer may not wish for the customer's product holding to be used in this manner.

As such, at step eight, the customer may authenticate with the server 117 to update the user's permission settings using the user attribute configuration user interface 118. For example, of the available attributes, the customer may deselect certain of the available attributes, in this case, being the product holding attributes.

At step nine, the server 101 updates the attributes 106. For example, the server 117 may update a distributed block chain ledger 116 with the user-specified preferences which is read by each server 101 of each enterprise accordingly.

For example, the server 101 may monitor updates to the block chain ledger 116 and cross-reference user identities of updates thereon with user identities of the customers of the enterprise. When detecting an update in relation to a particular customer, the server 101 is configured for updating the attributes 106 accordingly.

Alternatively, the server 117 may communicate with the server 101 via the API 115 directly.

As such, in accordance with this example, the server 101 may mark the product holding attributes 106 as being disabled. In a preferred embodiment, the server 101 may delete the product holding attributes from the structured data file 105. The associated data values 107 may be disabled or deleted respectively also.

Step 10 may comprise the server 101 reloading values 110 from the data systems 109 according to the updated attributes 106 if necessary.

Thereafter, step 11 comprises republication of the data file which, as described above, may be published to the live database 120 or the various sensors of the subsystem 103. As alluded to above, in embodiments, the data file 105 may be published or stored by the user device 104 which, when in proximity with the in-store electronic device management subsystem 103, transmits the data file 105 directly thereto using such technology such as UWB.

Step 12 may comprise a further interaction with the same customer wherein, similarly, the customer may be identified using the access point 122, facial recognition or the like.

The rules engine 119 specifies the play out of the welcome experience. Specifically, the rules engine 190 may control the synchronisation of timing of interactions across any of the electronic devices of the experience management subsystems 103, based on input data received.

However, in this case, the experience author 129, when retrieving and inspecting the structured data file 105, detects that the product holding attributes are missing from the structured data file 105, or otherwise disabled.

As such, the experience author 129 generates the welcome experience accordingly wherein, for example, the electronic display 126 may rather display "Hello Roger, how can I help you?"

As can be appreciated, the experience author controller 129 has dynamically configured the displayed information in accordance with the data file 105 retrieved quickly from the live database 120, thereby allowing for substantial real-time privacy law compliant display of customer information which is customised in accordance with user preferences and which does not require a round-trip query to the server 101.

As alluded to above, in embodiments, the updated structured data file 105 may be used by the various sensors to decide whether to record particular types of information.

For example, the customer may disable use of predicted intent.

As such, the structured data file 105 with the predicted intent attributes deleted or otherwise disabled is provided to the memory device of the image processing AI controller 125. As such, when predicting customer intent using artificial intelligence, the image processing AI controller 125 may detect that the predicted intent attributes of the customer specific structured data file 105 are missing and would therefore not record the artificially intelligent detected predicted intent of the particular customer.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A real-time digital device user interaction control system for generating user interactions in substantial real-time in accordance with user-specified attribute settings, the system comprising a server in operable communication with an electronic device experience management subsystem, the experience management subsystem comprising at least one output electronic device and at least one sensor operably coupled across a local network wherein the server is configured for generating a unified visitor structured data file comprising configured attributes configured in accordance with a set of available attributes and user-specified sub selections thereof and publishing the unified visitor structured data file for the electronic device experience management subsystem whereafter the electronic device experience management subsystem is configured for identifying a customer using the at least one sensor and dynamically configuring the output of data using the at least one output electronic device in accordance with the configured attributes, without querying the server for the configured attributes, wherein publishing the unified visitor structured data file comprises publishing the unified visitor structured data file to a user device which, when in proximity with the electronic device experience management subsystem, transmits the unified visitor structured data file directly to the electronic device experience management subsystem.

2. The system as claimed in claim 1, wherein the unified visitor structured data file comprises data values for the configured attributes and wherein the server is configured for pre-populating the data values with data from at least one data source.

3. The system as claimed in claim 2, wherein the at least one data source comprises at least one of cameras, sensors, AI systems, analytics data warehouses and enterprise data systems.

4. The system as claimed in claim 1, wherein publishing the unified visitor structured data file comprises publishing the unified visitor structured data file to a live database of the electronic device experience management subsystem.

5. The system as claimed in claim 4, wherein the at least one output electronic device is in operable communication with the live database using at least one of web sockets and database watcher.

6. The system as claimed in claim 1, wherein the user device transmits the unified visitor structured data file directly to the electronic device experience management subsystem using at least one of Bluetooth and Ultra Wide Band (UWB) technology.

7. The system as claimed in claim 1, wherein publishing the unified visitor structured data file comprises publishing the unified visitor structured data file to a memory device of the at least one sensor.

8. The system as claimed in claim 7, wherein the at least one sensor is configured for updating a data value of the unified structured data file dependent on the at least one configured attribute.

9. The system as claimed in claim 8, wherein the sensor is configured for updating the data value of the unified structured data file dependent on the presence of the at least one configured attribute.

10. The system as claimed in claim 1, wherein the server is configured for receiving the available attributes via an API.

11. The system as claimed in claim 1, wherein the server is configured for receiving the user-specified sub selections of the available attributes and configuring the configured attributes accordingly.

12. The system as claimed in claim 11, wherein the server is configured for receiving the sub selection of the available attributes from a third-party server.

13. The system as claimed in claim 11, wherein the server is configured for receiving the sub selection of the available attributes from a distributed block chain ledger.

14. The system as claimed in claim 13, wherein the server is configured for monitoring updates of the distributed block chain ledger and cross-referencing user IDs of the updates with anonymised customer IDs.

15. The system as claimed in claim 1, wherein the sensors comprise a proximity sensor configured to detect the proximity of the customer.

16. The system as claimed in claim 15, wherein the proximity sensor comprises a virtual received signal strength (RSI) proximity sensor.

17. The system as claimed in claim 15, wherein the proximity sensor comprises is at least one of a Bluetooth Low Energy (BLE) and Ultra Wide Band (UWB) sensor.

18. The system as claimed in claim 1, wherein the sensor comprises a camera.

19. The system as claimed in claim 18, further comprising an image processing controller operably coupled to the camera.

20. The system as claimed in claim 19, wherein the image processing controller is configured for detecting at least one of a facial ID, a predicted age, a predicted gender and a predicted intent using image processing.

21. The system as claimed in claim 1, wherein the system is configured for detecting the proximity of the customer and prefetching the unified visitor structured data file.

22. The system as claimed in claim 21, wherein the system comprises an access point and wherein the system is configured for detecting the proximity of the customer by receiving a wireless transmission from at least one of a smartphone device and wearable device of the customer via the access point.

23. A real-time digital device user interaction control system for generating user interactions in substantial real-time in accordance with user-specified attribute settings, the system comprising a server in operable communication with an electronic device experience management subsystem, the experience management subsystem comprising at least one output electronic device and at least one sensor operably coupled across a local network wherein the server is configured for generating a unified visitor structured data file comprising configured attributes configured in accordance with a set of available attributes and user-specified sub selections thereof and publishing the unified visitor structured data file for the electronic device experience management subsystem whereafter the electronic device experience management subsystem is configured for identifying a customer using the at least one sensor and dynamically configuring the output of data using the at least one output electronic device in accordance with the configured attributes, without querying the server for the configured attributes, wherein publishing the unified visitor structured data file comprises publishing the unified visitor structured data file to a memory device of the at least one sensor.

* * * * *